United States Patent [19]
Kohner

[11] Patent Number: 5,709,034
[45] Date of Patent: Jan. 20, 1998

[54] SPIRIT LEVEL

[75] Inventor: Gabriel Kohner, Kibbutz Amiad, Israel

[73] Assignee: Kapro Industries Ltd., Hakerem, Israel

[21] Appl. No.: 608,757

[22] Filed: Feb. 29, 1996

[30]   Foreign Application Priority Data

Mar. 5, 1995   [IL]   Israel ......................... 112882

[51] Int. Cl.⁶ ................................... G01C 9/28
[52] U.S. Cl. ........................ 33/377; 33/365; 33/379
[58] Field of Search ........................ 33/377, 365, 378, 33/379, 381, 382, 389, 390

[56]   References Cited

U.S. PATENT DOCUMENTS

| | | | |
|---|---|---|---|
| 1,777,429 | 10/1930 | Charlton | 33/381 |
| 2,669,029 | 2/1954 | Ries | 33/377 |
| 3,738,015 | 6/1973 | De Jong | 33/379 |
| 4,124,940 | 11/1978 | Vaida | 33/379 |
| 4,860,459 | 8/1989 | Dengler | 33/379 |
| 5,406,714 | 4/1995 | Baker et al. | 33/381 |

*Primary Examiner*—Christopher W. Fulton
*Attorney, Agent, or Firm*—Ladas & Parry

[57]   ABSTRACT

A spirit level including a body portion having at least one open, hollow end, the body portion having at least one aperture formed on a face thereof, and a clamp insertable into the at least one hollow end, the clamp including at least one vial mounting portion, the clamp being folded and inserted into the at least one hollow end, the at least one vial mounting portion being adapted to be fixedly held in the at least one aperture after insertion of the clamp into the at least one hollow end, wherein a vial is fixedly mountable in the at least one vial mounting portion.

7 Claims, 3 Drawing Sheets

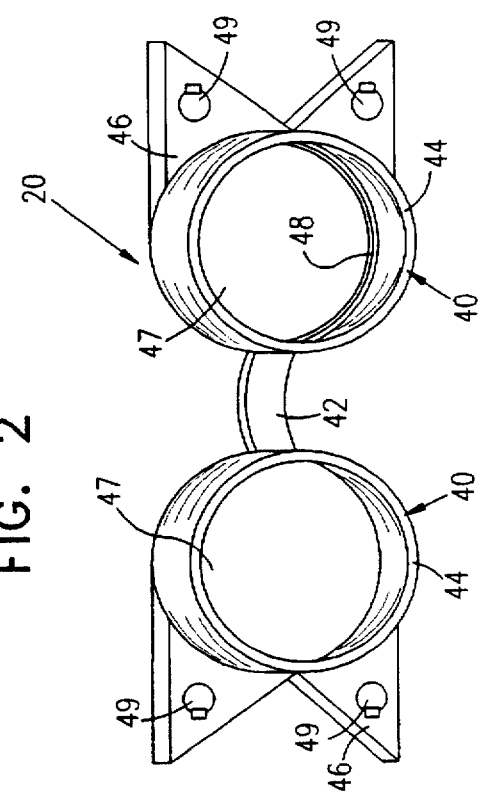
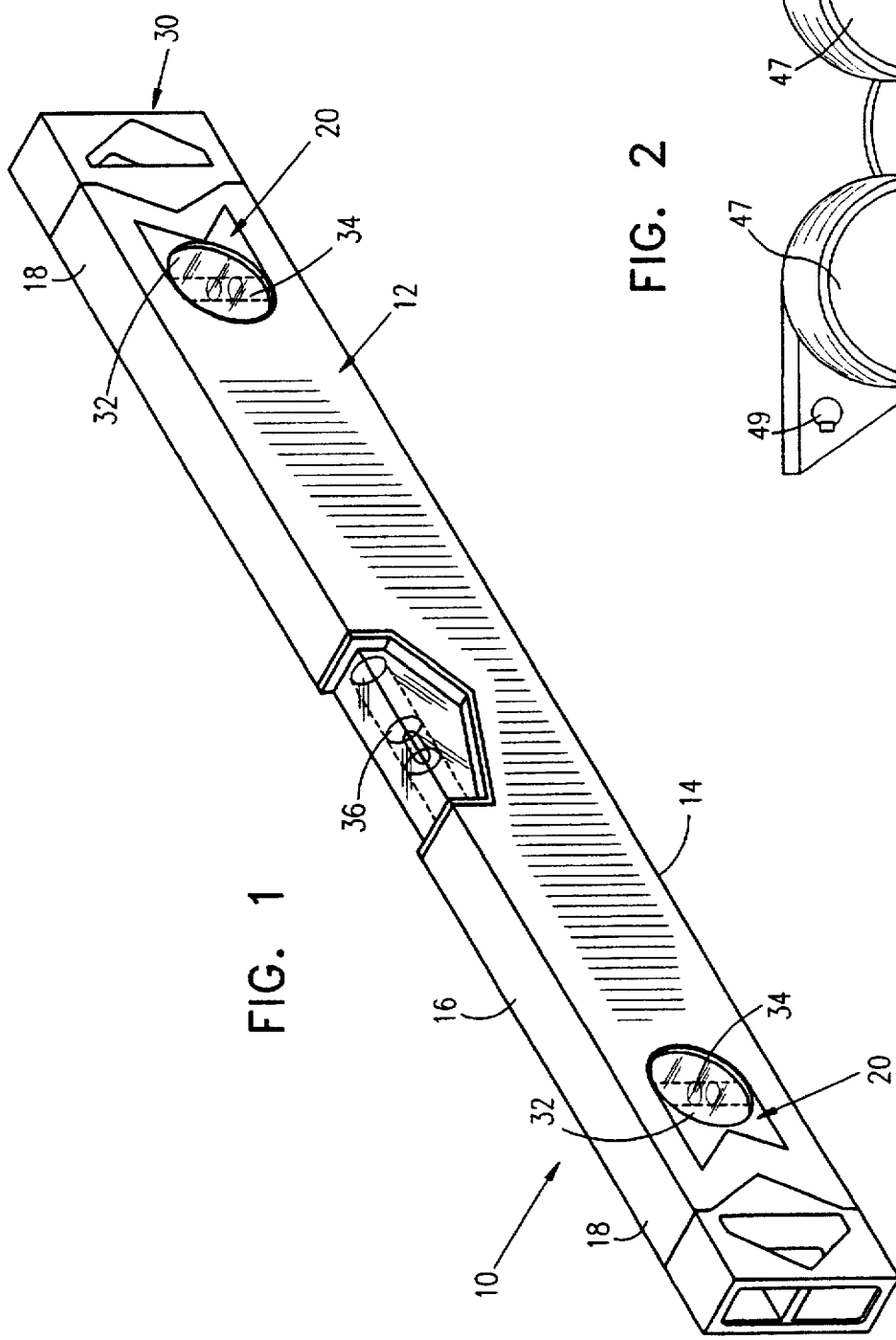

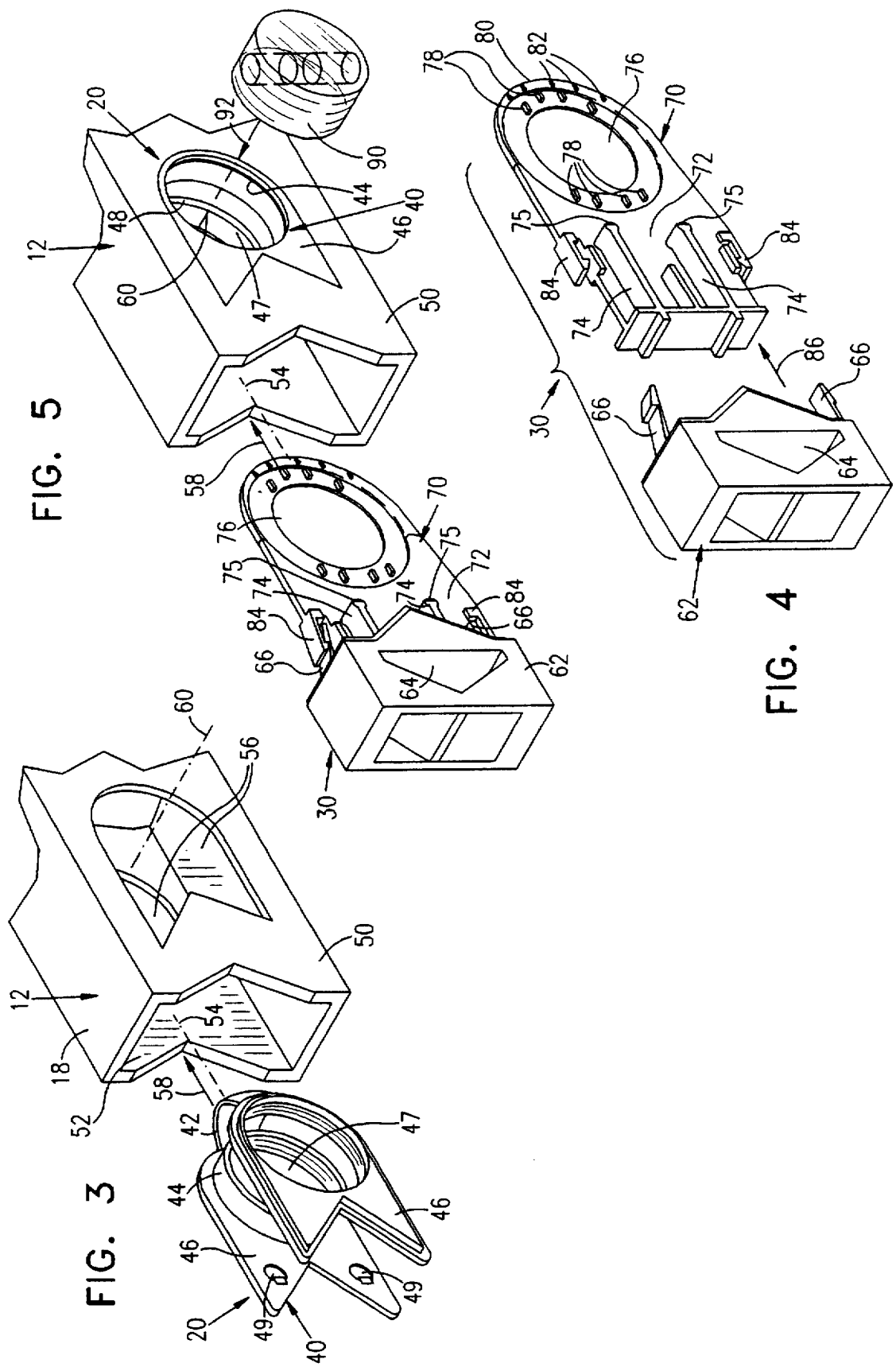

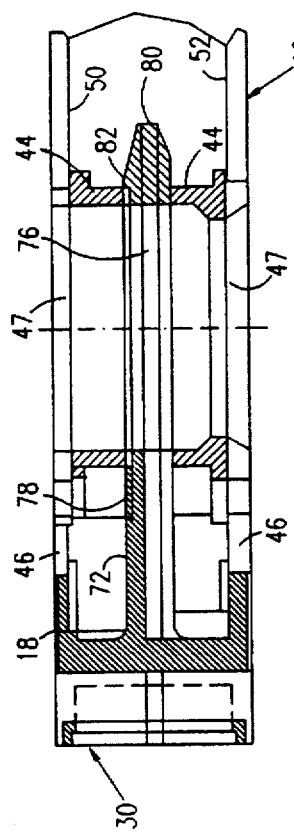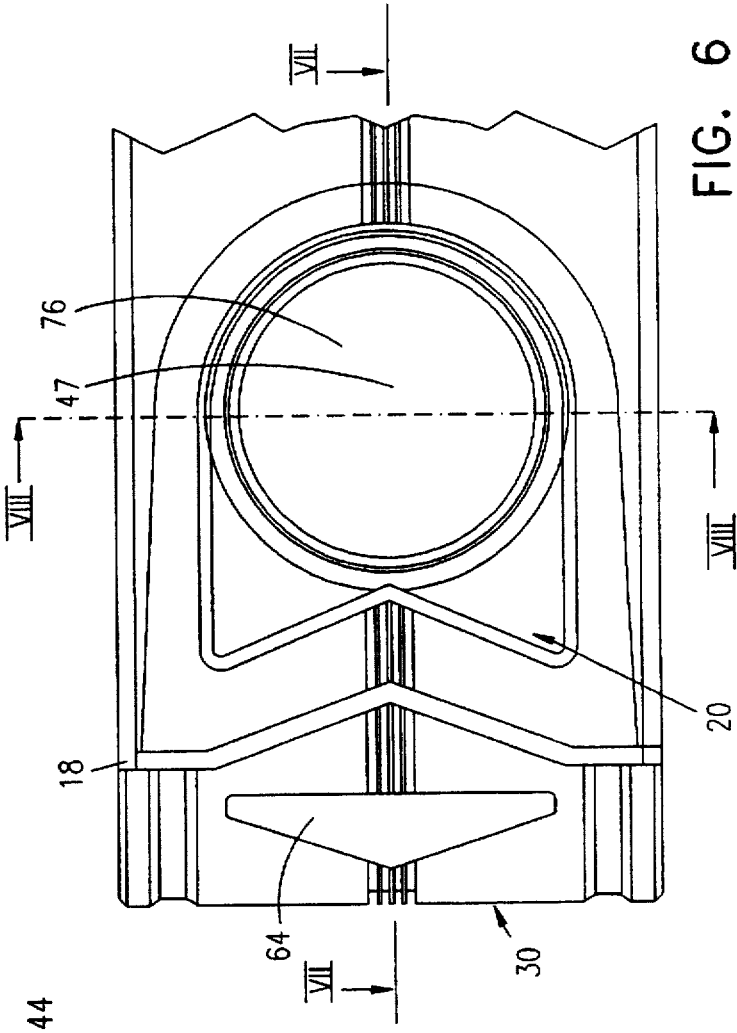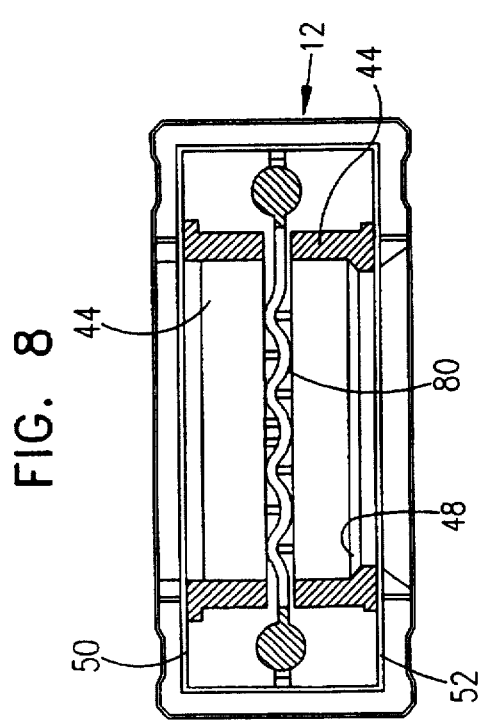

5,709,034

SPIRIT LEVEL

FIELD OF THE INVENTION

The present invention relates to spirit levels.

BACKGROUND OF THE INVENTION

Spirit levels, well known in the art, are instruments used for setting horizontal or vertical surfaces. The level includes a sealed vial containing an air bubble floating in liquid. The particular surface is considered horizontal or vertical when the air bubble rests between predetermined graduated marks in the vial.

Professional grade spirit levels are highly accurate, and are typically manufactured from a stable, rigid metal body, such as an aluminum alloy. In order to prevent damage to the level, such as in the event of an accidental drop, accurate levels are typically provided with structural plastic ends. Since a level which falls to the floor usually strikes the floor initially at one of its extreme ends, the plastic end bears the brunt of the shock to the level, instead of the metal body of the level. Thus, even if the relatively inexpensive plastic end becomes damaged, it is easily replaced and the level retains its accuracy.

Two key problems in manufacturing a precision grade level are assembling and fixing the plastic ends within the metal body of the level, and achieving a desired degree of strength, accuracy and durability of the finished product.

SUMMARY OF THE INVENTION

The present invention seeks to provide an improved spirit level and method of manufacture therefor.

There is thus provided in accordance with a preferred embodiment of the present invention, a spirit level including a body portion having at least one open, hollow end, the body portion having at least one aperture formed on a face thereof, and a clamp insertable into the at least one hollow end, the clamp including at least one vial mounting portion, the clamp being folded and inserted into the at least one hollow end, the at least one vial mounting portion being adapted to be fixedly held in the at least one aperture after insertion of the clamp into the at least one hollow end, wherein a vial is fixedly mountable in the at least one vial mounting portion.

Preferably the at least one aperture is non-circular.

In accordance with a preferred embodiment of the present invention, the at least one hollow end is open along a longitudinal axis, and the face is generally perpendicular to the longitudinal axis.

Additionally in accordance with a preferred embodiment of the present invention, the spirit level includes an end cap which is inserted into the at least one hollow end after inserting therein the clamp, thereby applying a generally lateral force against the at least one vial mounting portion and fixedly pressing the at least one vial mounting portion in the at least one aperture.

Further in accordance with a preferred embodiment of the present invention, the end cap undergoes a deformation when applying the force against the at least one vial mounting portion, the deformation further fixing the end cap and the clamp in the at least one hollow end.

Preferably the end cap is formed with a Euro-slot.

There is also provided in accordance with a preferred embodiment of the present invention, a method for manufacturing a spirit level, the method including the steps of:

providing a body portion having at least one open, hollow end, the body portion having at least one aperture formed on a face thereof;

providing a clamp insertable into the at least one hollow end, the clamp including at least one foldable vial mounting portion;

inserting the clamp, with the at least one foldable vial mounting portion folded, into the at least one hollow end;

fixing the at least one vial mounting portion in the at least one aperture; and fixedly mounting a vial in the at least one vial mounting portion.

BRIEF DESCRIPTION OF THE DRAWINGS

The present invention will be understood and appreciated from the following detailed description, taken in conjunction with the drawings in which:

FIG. 1 is a simplified pictorial illustration of a spirit level, constructed and operative in accordance with a preferred embodiment of the present invention;

FIG. 2 is a simplified pictorial illustration of a clamp used in the spirit level of FIG. 1;

FIG. 3 is a simplified pictorial illustration of folding and inserting the clamp in the spirit level, in accordance with a preferred embodiment of the present invention;

FIG. 4 is a simplified, exploded pictorial illustration of an end cap used in the spirit level, in accordance with a preferred embodiment of the present invention;

FIG. 5 is a simplified pictorial illustration of inserting the end cap in the spirit level;

FIG. 6 is a simplified illustration of the end cap assembled with the clamp; and FIGS. 7 and 8 are simplified sectional illustrations of the end cap assembled with the clamp, taken along lines VII—VII and VIII—VIII, respectively, in FIG. 6.

DETAILED DESCRIPTION OF PREFERRED EMBODIMENTS

Reference is now made to FIG. 1 which illustrates a spirit level 10, constructed and operative in accordance with a preferred embodiment of the present invention.

Spirit level 10 preferably includes a body portion 12, typically extruded from an aluminum alloy. Body portion 12 is preferably hollow and has a generally rectangular cross section. Body portion 12 preferably has a main measuring surface 14, a secondary measuring surface 16, and a pair of ends 18. Measuring surfaces 14 and 16 are preferably machined to desired smoothness and flatness tolerances, and possibly to a mutual parallelism tolerance as well.

In accordance with a preferred embodiment of the present invention, spirit level 10 is provided at each end 18 thereof with a clamp 20 and an end cap 30. Each clamp 20 houses a vial 32, in which is disposed a bubble level 34 for measuring or setting vertical surfaces. A central bubble level 36 is preferably provided for measuring or setting horizontal surfaces.

It is a particular feature of the present invention that clamps 20 and end caps 30 help provide the desired degree of accuracy and durability of spirit level 10, as is described hereinbelow.

Reference is now made to FIG. 2 which pictorially illustrates one of clamps 20. It is seen that clamp 20 is preferably provided with a pair of vial mounting portions 40 connected to each other by a resilient strip 42. Each vial mounting portion 40 includes a relatively short, generally cylindrical band 44 protruding generally perpendicularly from a non-circular, generally rigid flap 46. Each band 44 defines a generally circular aperture 47. One of bands 44 is formed with a radially inward ridge 48 located near flap 46. Each flap 46 is also preferably formed with a pair of depressions 49.

Reference is now made to FIG. 3. Each end 18 of body portion 12 preferably includes a pair of opposing, generally flat surfaces 50 and 52. End 18 is open along a longitudinal axis 54, and faces 50 and 52 are generally perpendicular to longitudinal axis 54. An aperture 56 is preferably formed in each surface 50 and 52. Aperture 56 is preferably non-circular, and furthermore, has a shape which corresponds to the shape of flap 46.

Clamp 20 may be folded along resilient strip 42 and inserted into hollow end 18, generally in the direction of an arrow 58, as shown in FIG. 3. The resiliency of strip 42 tends to push each flap 46 outwards along an axis 60 generally perpendicular to axis 54, causing flaps 46 to be seated in each aperture 56. FIG. 5 illustrates vial mounting portions 40 seated in apertures 56. The relatively tight fit of flaps 46 in apertures 56, and their non-circular shape, ensure that flaps 46 do not rotate about axis 60.

Reference is now made to FIG. 4. Each end cap 30 preferably includes a hanging portion 62 which is formed with a Euro-slot 64. In the prior art, a mounting or hanging slot is generally formed in the body portion of the level. By forming Euro-slot 64 in end cap 30, the present invention improves upon the prior art, because fabrication of body portion 12 is less costly and involves fewer manufacturing steps. Euro-slot 64 has a generally negligible effect on the cost of a plastic mold used to fabricate end cap 30.

Hanging portion 62 preferably includes a pair of resilient tongues 66.

End cap 30 preferably further includes an insertion portion 70. Insertion portion 70 preferably includes a generally flat portion 72, from which protrude generally perpendicularly a plurality of stiffening ribs 74. Each stiffening rib 74 preferably has a wedge portion 75. A generally circular hole 76 is preferably formed on flat portion 72, hole 76 having substantially the same diameter as circular apertures 47 of vial mounting portions 40.

There is preferably a plurality of short protrusions 78 located on flat portion 72 at the periphery of hole 76. A leading edge 80 of flat portion 72 may also be provided with a plurality of short protrusions 82.

Insertion portion 70 preferably includes a pair of resilient tongues 84. End cap 30 is preferably assembled by snapping hanging portion 62 together with insertion portion 70. This is accomplished by pushing hanging portion 62 in the direction of an arrow 86, thereby causing resilient tongues 66 of hanging portion 62 to mate and lock with corresponding tongues 84 of insertion portion 70.

Reference is now made to FIG. 5. End cap 30 may be inserted into hollow end 18 in the direction of arrow 58. The insertion of end cap 30 into hollow end 18, applies an outwardly directed force against each vial mounting portion 40, generally along axis 60, thereby fixedly pressing each vial mounting portion 40 in each aperture 56.

Reference is now made to FIGS. 6, 7 and 8. FIG. 6 is a front view illustration of end cap 30 assembled with clamp 20. It is noted that hole 76 and apertures 47 are substantially concentric.

In FIG. 7, it is seen that flat portion 72 is force fit between both bands 44, thereby deforming protrusions 78 and 82 somewhat. In FIG. 8, it is seen that leading edge 80 may even buckle and become wavy shaped. It is a particular feature of the present invention that deforming protrusions 78 and 82 and leading edge 80, further fixes end cap 30 and clamp 20 in hollow end 18. It is noted that tongues 66 and 84 (not shown in FIGS. 6–8) may also become deformed upon insertion of end cap 30 into hollow end 18, thus creating an additional pre-load which further clamps and locks hanging portion 62 with insertion portion 70.

Furthermore, the forced insertion of end cap 30 into clamp 20 preferably causes each wedge portion 75 of stiffening ribs 74 (not seen in FIGS. 6, 7 and 8) to become wedged into a corresponding depression 49 (not seen in FIGS. 6, 7 and 8) of flaps 46, thereby further preventing insertion portion 70 from becoming dislodged from flaps 46.

Reference is made again to FIG. 5. Once each end cap 30 and each vial mounting portion 40 have been fixed in each end 18 of body portion 12, a vial 90 may be inserted in clamp 20 in the direction of an arrow 92, generally along axis 60. Vial 90 preferably butts against ridge 48 (not shown). Vial 90 is preferably calibrated and then bonded in place with adhesive. As is appreciated by persons skilled in the art, vial 90 may be alternatively fixed by other methods, such as by ultrasonic welding or screws.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

I claim:

1. A spirit level comprising:
   a body portion having at least one open, hollow end, and at least one non-circular aperture formed on a face thereof;
   a clamp insertable into said at least one hollow end, said clamp comprising at least one vial mounting portion, said clamp being folded and inserted into said at least one said at least one vial mounting portion being fixedly held in said at least one non-circular aperture and having a precisely fixed orientation relative to said body portion which is determined by said non-circular aperture and
   a vial calibrated and bonded in place onto said vial mounting portion following insertion of said clamp into said body portion.

2. A spirit level according to claim 1 and wherein said clamp is formed as a single element having a pair of vial mounting portions connected to each other by a resilient strip, said pair of vial mounting portions being folded along said resilient strip such that said pair of vial mounting portions are in generally overlying mutual alignment.

3. A spirit level according to claim 1 and wherein said at least one hollow end is open along a longitudinal axis, and said face is generally perpendicular to said longitudinal axis.

4. A spirit level according to claim 1 and comprising an end cap which is inserted into said at least one hollow end after inserting therein said clamp, thereby applying a generally lateral force against said at least one vial mounting portion and fixedly pressing said at least one vial mounting portion in said at least one aperture.

5. A spirit level according to claim 4 and wherein said end cap undergoes a deformation when applying said force against said at least one vial mounting portion, said deformation further fixing said end cap and said clamp in said at least one hollow end.

6. A spirit level according to claim 4 and wherein said end cap is formed with a Euro-slot.

7. A method for manufacturing a spirit level, said method comprising the steps of:

providing a body portion having at least one open, hollow end, said body portion having at least one aperture formed on a face thereof;

providing a clamp insertable into said at least one hollow end, said clamp comprising a single element having a pair of foldable vial mounting portions connected to each other by a resilient strip;

folding said pair of vial mounting portions along said resilient strip such that said pair of vial mounting portions are in generally overlying mutual alignment;

inserting said clamp, with said vial mounting portions folded into said at least one hollow end;

fixing said vial mounting portions in said at least one aperture; and fixedly mounting a vial in said vial mounting portions.

* * * * *